March 25, 1930.  S. C. SMITH  1,752,210
FABRIC AND THE TREATMENT OF SUBDIVIDED MATERIALS
Filed March 31, 1928   4 Sheets-Sheet 1
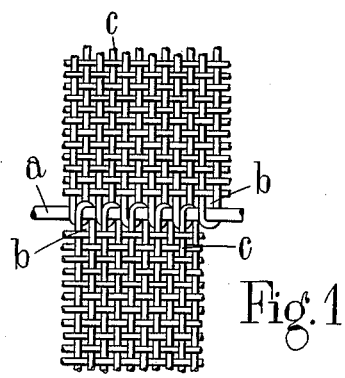
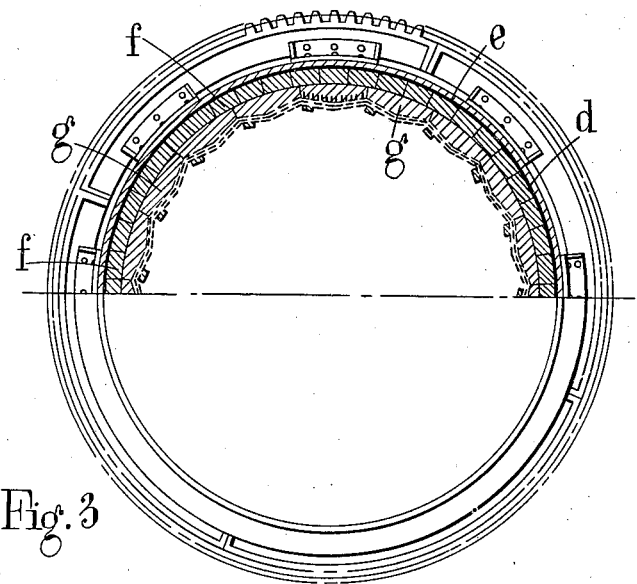
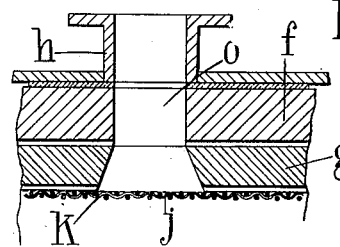
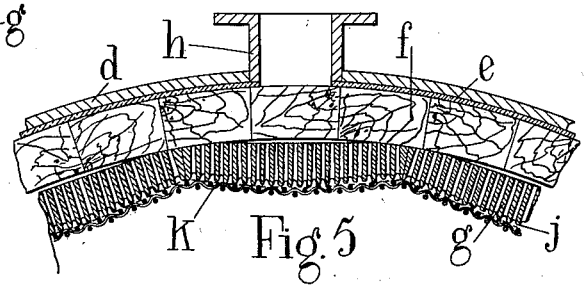
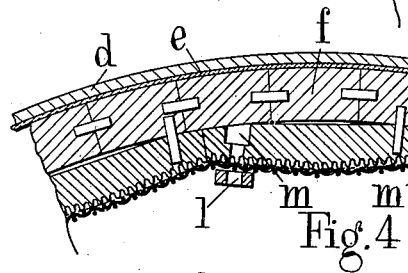
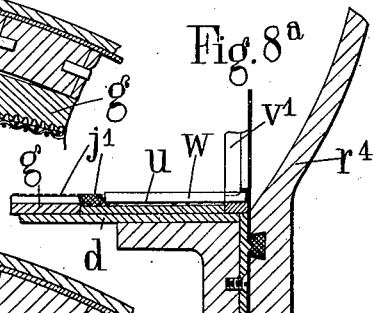
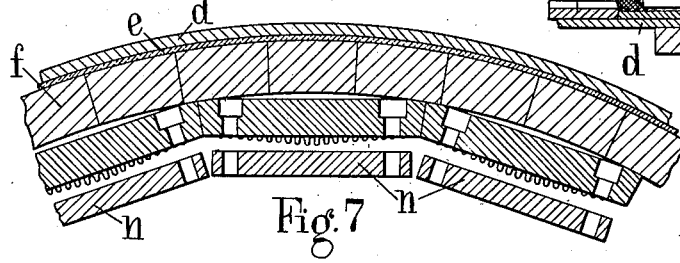
S. C. Smith
INVENTOR

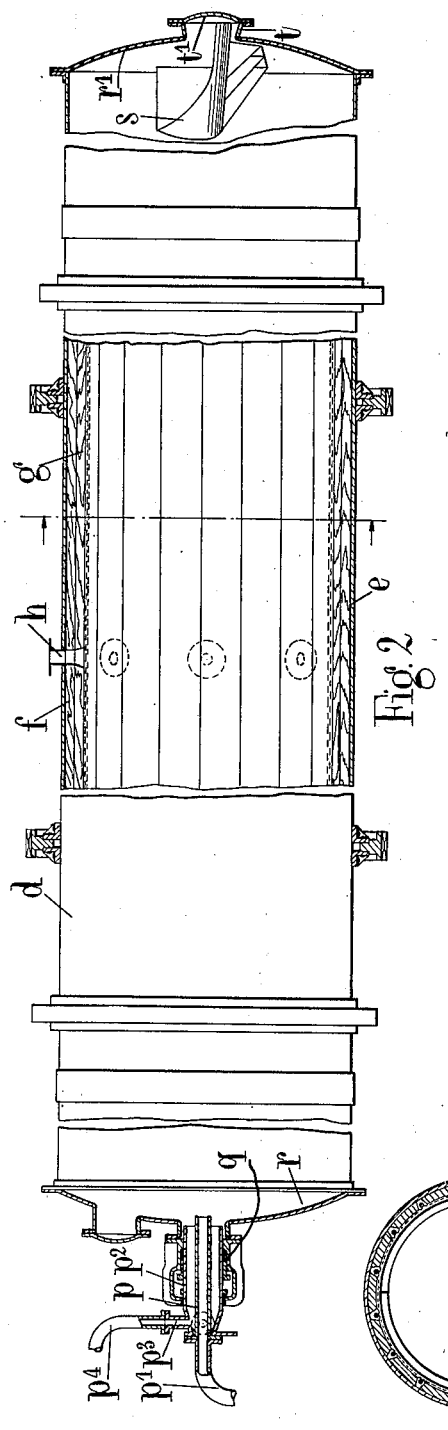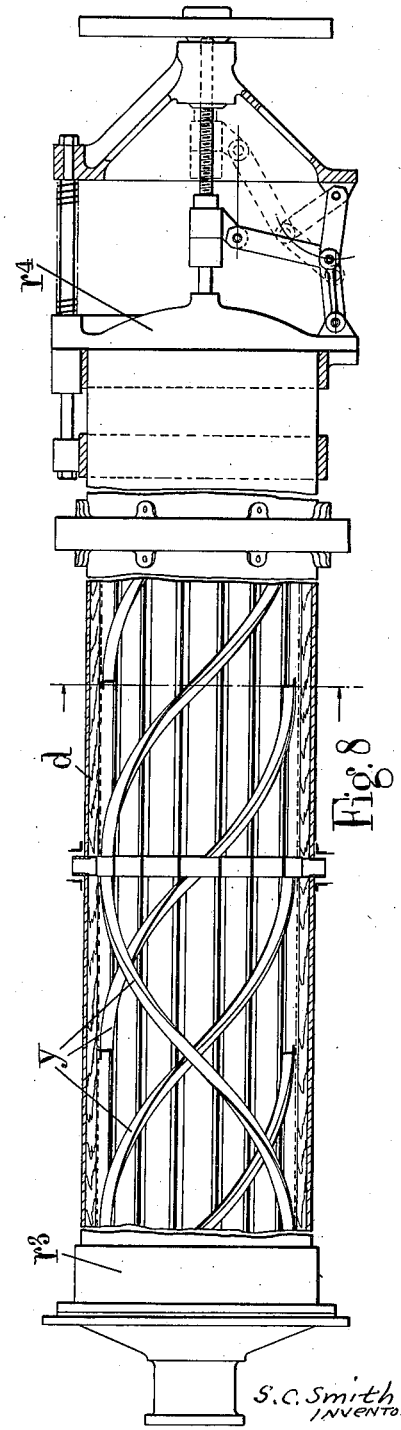

March 25, 1930. S. C. SMITH 1,752,210
FABRIC AND THE TREATMENT OF SUBDIVIDED MATERIALS
Filed March 31, 1928 4 Sheets-Sheet 4

S. C. Smith
INVENTOR

By: Marks & Clerk
ATTYS.

UNITED STATES PATENT OFFICE

STANLEY COCHRAN SMITH, OF LONDON, ENGLAND

FABRIC AND THE TREATMENT OF SUBDIVIDED MATERIALS

Application filed March 31, 1928, Serial No. 266,437, and in Great Britain April 5, 1927.

The object of the present invention is to provide improved methods and means for treating and handling solids or more or less subdivided materials on filters for solution, reaction or both and/or washing as for instance in the treatment of ores generally in the wet way for the separation of the metallic constituents.

It has been found that rubber offers high resistance to erosion such as may be met with in filtering of subdivided materials of a hard or gritty nature, for instance in the wet screening of ores as on shaking or rotating screens. Rubber also when suitably compounded resists acid attack and I have found it can even be used in, for instance, rotary filters for the treatment of complex sulphide ores with, for instance, hydrochloric acid, under which conditions the rubber may have to resist both corrosion due to the acid and erosion due to suspended gritty particles. All available filtering media, whether metallic or textile, give way under such conditions. Any substantial elastic stretch in the fabric such as occurs in fabrics hitherto produced and formed by utilizing with for example cotton threads, rubber threads, so as to permit stretching of the fabric in one direction should in the present case be avoided.

In applying my invention to a rotary vacuum, suction, or pressure filter, a drum, disc or the like of suitable construction may be lined internally or externally with one or more layers of suitably perforate or liquid-pervious rubber sheeting material or fabric woven from rubber cords which layer or layers may be used alone or for example as a protection over one or more other finer-pore layers say of wire mesh, cocoanut matting or asbestos cloth and rubber material may be used also as a backing for such other layers. The rubber fabric or material which may be held in any convenient manner will stand up to erosion of gritty matter under treatment and will retain the filtering medium in place. It will also guard the filtering material against damage such as might arise from movement due to changing conditions of pressure or vacuum.

A suitable erosion-resisting or protective fabric may be formed by using as warp rubber cord preferably of a substantially inextensible character, that is substantially inextensible under the conditions of weaving or of use in a filter. The weft used is of a similar character and, if desirable, may have a flexible and substantially inextensible core, for instance a textile core or a metal core such as copper or iron wire in solid or stranded form as may also have the warp cords.

By using in warp and/or weft rubber cord of suitable thickness and strength and preferably cored with, for instance, copper or iron wire it is possible to produce a sufficient rigidity to enable same to maintain a suitable shape independently of other means.

Rubber of suitable quality for the purpose is that having low elasticity or extensibility or having a reasonable resistance to distortion due for instance to the presence of fillers or loading materials. Either or both the warp and weft cords may be similar in appearance to rubber-covered copper wire such as that often used for electrical leads and the usual electric testing will ensure freedom from flaws.

Strips of the fabric may be made by taking a suitable number of warps of rubber cord of, say, $\tfrac{3}{16}$ths to $\tfrac{1}{4}$ of an inch diameter and lacing the weft, which may be of similar dimensions, continuously from edge to edge under suitable tension, beating up, as required, to form a uniform fabric. The warp may be tensioned and the weft left substantially free of tension to flex and follow more or less the contours of the adjoining warp sections. The weft may be of rubber cord of the same or substantially the same diameter as the warp cords and by any suitable weave a fairly close mesh is obtainable. If desired for any purpose a finer or closer mesh is obtained by using as weft and/or warp finer cords than those of the warp.

The fabric may be woven of vulcanized rubber cord or alternatively of unvulcanized cord, the woven fabric being subsequently vulcanized after being formed to any desired shape.

The free ends of the fabric may be secured in any manner and the strip so maintained in shape, for instance, by vulcanizing or, if the fabric is to be mounted in flat or curved supports, such mounting, as by means of clamping strips or the like, may also be depended upon to hold the ends of the fabric cords in position.

The rubber material should preferably offer resistance also to corrosion as by acids and it is found that a suitable rubber for this purpose is heavily loaded material such as the composition bearing the registered trademark "Cabtyrit". This material also possesses the desired inextensibility and low elasticity. Where a metal core is provided in the warp and/or weft cords it is desirable to choose such a metal as is inert to the liquors used.

Referring now to the accompanying drawings:—

Figure 1 is a fragmentary view of a rubber cord fabric such as may be used in filters according to my invention;

Figure 2 is an elevation partly in longitudinal section of an improved rotary filter drum to show an application of filtering means according to the invention to rotary drum filters in which filtrate liquors are removed by internal pressure;

Figure 3 is an end view of the drum shown in Figure 2, the upper half being shown as a cross section on the line A—A of Figure 2;

Figure 4 is an enlarged fragmentary cross section corresponding to the upper part of Figure 3;

Figure 5 is a similar view to Figure 4 but taken at the centre of length of the drum;

Figure 6 is a longitudinal section at the same region as Figure 5;

Figure 7 is a fragmentary cross section taken closely adjacent one end of the drum;

Figure 8 is an elevation corresponding to Figure 2 of a modified construction of filter drum;

Figure 8a is an enlarged fragmentary longitudinal section at one corner of the device shown in Figure 8;

Figure 9 is a half cross section at A—A of Figure 8;

Figure 10:
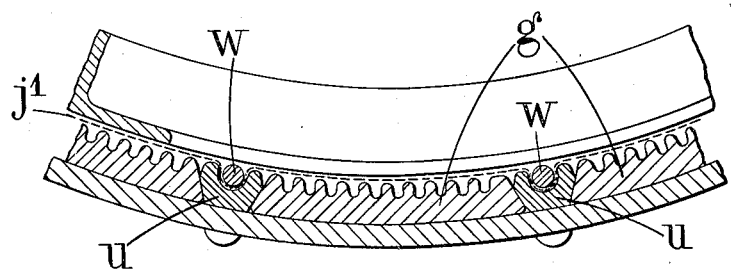
Figure 10 is an enlarged fragmentary cross section of the device shown in Figure 8.

The apparatus shown in the drawings is adapted for handling wet mixtures of a corrosive and gritty nature as for leaching and/or washing thereof; for instance it is well adapted for the treatment of complex ores as described in my prior British Patent specification No. 264,569 and comprises a revoluble steel or like cylinder of any suitable length and diameter which may be supported and rotated in any manner, a number say two tires or tracks being provided on the periphery of the drum and adapted to rotate on suitable roller arrangements. The rotational drive may be applied at a number of regions of the drum as by means of spur wheels mounted round the periphery at different points. The interior of the drum is lined as shown in the enlarged sections in Figures 3 and 4 with a layer of rubber $e$ preferably vulcanized to the inside of the shell. On the layer of rubber is superposed a backing of wooden strips or packing boards $f$ arranged in a cylinder like the staves of a barrel and suitably dowelled as shown or otherwise held securely together. On the inside of this wooden lining $f$, between which and the rubber lining referred to a layer of bituminized asbestos cloth or the like may be provided, a composite filter is built. This latter comprises a liquid venting layer composed of longitudinal boards $g$ of wood such as pitch pine or teak or of any other non-corrodible material, which are arranged as shown from end to end of the drum and for instance radially dowelled to the underlying lining $f$.

The inner surfaces of the boards $g$ are preferably cambered as shown and are grooved or corrugated lengthwise to any suitable depth except at a region near the centre of the length of the cylinder, in which region the grooves are cut right through the staves as shown in Figures 5 and 6. The wooden packing boards $f$ are built so as to leave an annular space $o$ behind the perforate regions of the grooved staves $g$ and opposite to said space and suitable pitched around the drum shell a plurality of outlet branches $h$ are provided. The remainder of the filter comprises one or more layers of suitably inert fine mesh cloth or the like $j$ held against the grooved wood surfaces and a protective layer $k$ of erosion- and corrosion-resisting pervious rubber material preferably rubber cord fabric of suitably fine mesh and of the kind described in an earlier part of this specification. These last two layers which may be in any number of sections for convenience are preferably held on the grooved wood backing by means of longitudinal strips or slats $l$ of wood screwed down preferably by bolts passing through holes $m$ as shown in the grooved staves $g$. The provision of the cambers on the grooved surfaces ensures contact of the filtering layer therewith under suitable circumferential tension.

A convenient way of uniting a number of sheets or the opposite edges of a single sheet of the woven rubber cord fabric is shown in Figure 1 wherein ends or edges meeting along a line parallel to the axis of the drum are lapped or butted together and secured conveniently by means of one or more longitudinal rods or wires as $a$ linking up by passage through loops $b$ left at the edges of the sheet where the weft cord $c$ leaving the edge of a strip is turned and entered again in the reverse direction.

At the regions of the filter adjacent the drum ends additional transverse wooden strips $n$ as shown in Figure 7 may be provided for holding the ends of the filtering media in place, the camber and grooving preferably being removed or omitted as shown at this region to facilitate the holding of the filter cloth in this manner. Such a construction affords ease of removal of the filter cloths and protective fabric as for replacement or cleaning purposes.

If the erosion-resisting rubber cord fabric can be made of sufficiently fine mesh for the purpose an underlying finer pore fabric or cloth in some cases need not be used. In further alternative when desired a composite filter may be employed having one or more fine pore layers as of glass wool or asbestos cloth and/or a coarser layer of cocoanut matting situate between the pervious rubber layer or fabric and the grooved filter boards or like liquid venting layer. The filter may further comprise two layers of rubber of convenient mesh; for instance the combined layers above referred to may be supported below by a second layer of rubber cord fabric which will act as a backing.

The filtrate liquors are removed from the interior of the vessel through the outlet branches $h$ which are in connection with the back or radially outermost side of the filter cloth $j$ by way of the grooves in the staves $g$ and the central annular space $o$ in the wood backing $f$ referred to. The solid residue is removed from the remote end of the drum and provision may be made for continuous or intermittent introduction and withdrawal of liquors.

Agitation of the magma may well be effected upon a filter so constructed without damage thereto and flow of liquor through the filter may be reversed and washing of the filter may be so effected.

The apparatus described above is applicable for substantially any process where it is desired to treat solids with liquors such as acids or corrosive fluids generally and enables all operations incidental thereto, such as washing and filtering, to be effected in a very much simpler manner than heretofore.

The use of rubber fabric is also of great advantage even where there is no acid in protecting the cloth against the erosive action of the solid material and against mechanical damage. By choice of suitable mesh or perforation the solids may become keyed against the rubber and may thus themselves advantageously act as a filter medium.

If it is desired a rubber cord fabric may be employed having a special construction such as will act to support solids in cake form even in drums of a very large diameter, that is where the arching effect is not so great, and even when the solids are of a very granular nature; for instance the fabric may be formed with loops projecting at intervals from the main surface so as to improve the keying effect of the solids thereon. A pile fabric may be formed from the rubber cord and employed with similar effects or the latter may be obtained by other means. An inner layer of cord fabric may be used having if desired a larger mesh and being held away from the other or outer layer of fabric by any convenient distance and by any means. The solids or cake may thus form between two layers of the cord fabric and be thus more securely keyed or held in place. In effect the fabric when used in a rotary filter drum may have to support that part of the cake above the level of the liquors and to take the strains which otherwise would have to be carried by the filtering material proper which is generally in a very delicate state under the operating conditions.

The above described apparatus is suitable for carrying out all the required operations of processes of treating ores on the lines of my process above referred to by leaching with hydrochloric acid a number of times, each time stronger than the last, and then washing and finally extracting with brine for removal of the lead chloride without removing the ore or residue from the vessel until finished.

According to one mode of operating the ore is first mixed with water in a separate vessel and pumped as a slurry into the rotating drum through a non-rotatable axial tube $p$ passing through a central gland arrangement $q$ rotatable with the end cover $r$. When the slurry has been admitted air is introduced as by means of a pipe $p^4$ and pipe $p^2$ through the gland arrangement and the liquors blown out through the filter and the branches $h$. The solids are then left as a cake or layer upon the filter. Internal pressure is now removed and cocks in connection with the branches $h$ are closed whereupon hydrochloric acid of suitable strength is pumped into the drum through for instance the tube $p^2$ passing through the cover $r$. The rotation of the drum may be stopped or slowed down during the introduction of acid and the reaction of the latter upon the solids may be brought about slowly to avoid or minimize frothing by gradually rotating the drum to bring only small amounts at a time of the cake into the liquor. When all the cake has been attacked and the violence of the reaction subsides, the drum may then be rotated at a greater speed and the rotation continued for the required time to exhaust or substantially exhaust the acid liquors. Pressure is then applied as before and the cocks connected with the branches $h$ opened and the weak acid liquor blown out. The acid treatment is then repeated in a similar manner any number of times but employing successively a stronger acid each time. After removal of the acid liquors the solids are washed by introducing water through the pipe $p^2$, the internal pressure preferably being maintained so as to keep the solids in cake form on the rotating filter. The washing may be effected on the countercurrent principle and if necessary this washing may be followed by one or more washes with alkali liquors such as weak solutions of lime or soda to neutralize any remaining acid. After removal of the washed liquors as before and release of the internal pressure, a brine solution is pumped into the vessel through the end cover $r$ and a slurry formed with the breaking up of the cake. The brine liquor here acts only as a vehicle whereby the solids are removed from the drum and can be pumped or otherwise led into a separate vessel of the same or a different type for leaching out the lead chloride.

The removal of the ore or slurry is effected by means of scoops one of which $s$ is shown in the drawings fixed upon the inside of the end cover $r'$ and rotatable with the drum. The material is thus collected and led to the central branch $t$ on the end cover through which it may be expelled.

After removal of the solids from the drum the filter may be washed for reception of a fresh batch of material by means of a current of water allowed to flow for any length of time through the filter in either direction, for instance if desired inwardly through the branches $h$ to the interior of the drum by way of the filter cloth.

The mother liquors remaining after the crystallizing out of the lead chloride from the brine liquors may be reutilized for leaching or for forming the slurry in which form the chloridized ore is removed from the drum.

In some cases the leaching may be effected without removal of the chloridized ore from the drum and in such an event it is preferable to introduce or be able to introduce all of the brine liquors necessary at once and to effect the leaching while the temperature of the liquor is at or above 90° C. The liquors when saturated are blown out and the residues preferably washed for instance with weak brines containing lead in decreasing amounts and finally with pure water. The cake is made into a slurry and is discharged as above described.

While it may be convenient to maintain the solids as a cake throughout all or a number of the various treatments and only thereafter to form a slurry of the solids as for removal, better effects may be obtained by repulping from time to time and agitating the slurry, reforming the cake during or at the commencement of each of the various filtering operations. In some cases the cake breaks up on release of the internal air pressure in the drum but much depends upon the nature and state of the ore and upon the mesh of the rubber fabric lining. It may be necessary to blow the solids off the filter for instance by introducing air into the venting layer behind the filter through the branches $h$.

The method above described may be modified to suit requirements; for instance the chloridizing liquors may be caused to flow or circulate continuously into the vessel through the end cover $r$, through the layer or cake of solid material and out through the branches $h$, the strength of said liquors being gradually increased to a maximum concentration and the chloridizing of the lead substantially completed in this manner. The concentration of the liquors is then gradually reduced to a minimum concentration as by introduction of acid liquors from previous chloridizing operations whereby to avoid excessive dilution of the more concentrated liquor in contact with the solid material at the completion of the chloridizing.

The leaching with brine may be effected in some such manner as has been described above.

Figure 13:
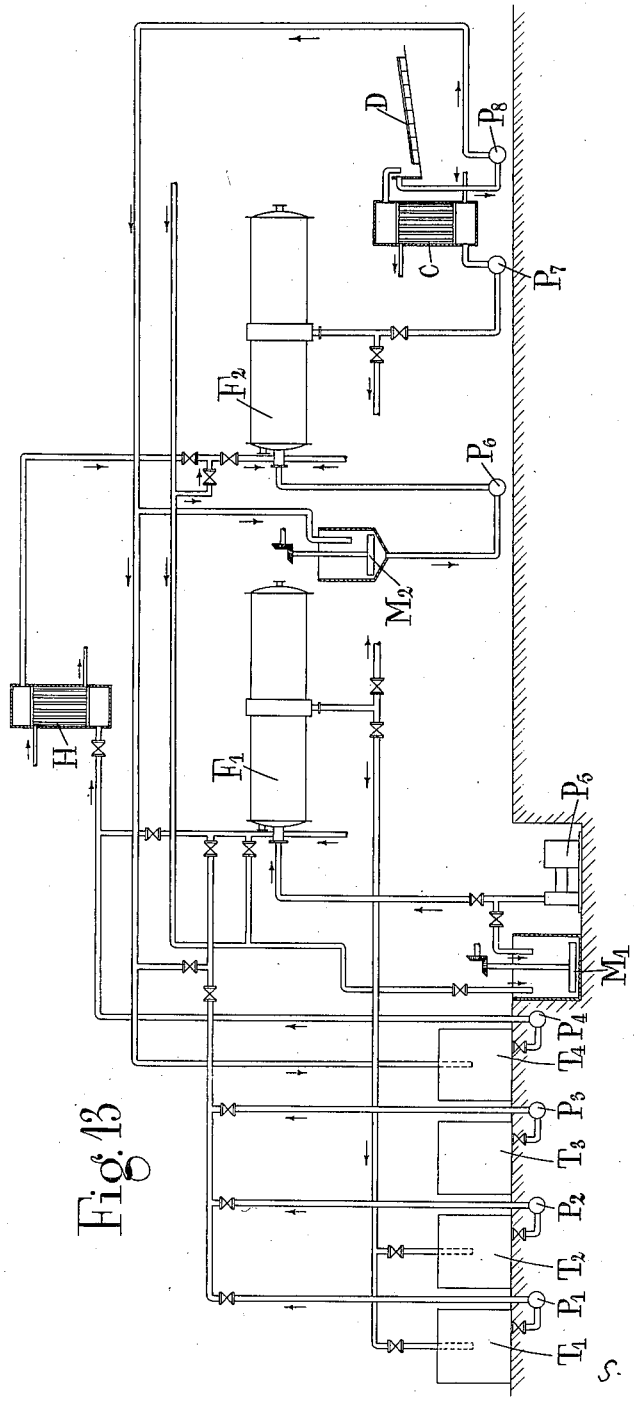
Figure 13 is a diagrammatic elevation showing a plant embodying rotary drums and allied gear.

Referring to the drawing, Figure 13, showing the general layout of a plant suitable for carrying out a process such as that above indicated for the treatment of lead sulphide ores, in the working of this plant ore and water may be fed into the slurry mixer $M^1$ and pumped by slurry pump $P^5$ to the revolving filter $F^1$. When all the charge is in the filter the water may be blown out as described and sent to waste by the connection shown.

The ore is then treated with weak hydrochloric acid from tank $T^1$ and when the acid is completely exhausted it is blown out and either sent to waste or treated in another plant for the recovery of any valuable constituents. Stronger acid treatment from tank $T^2$ then follows and the resultant liquor is then passed to tank $T^1$. Finally treatment is made with strong hydrochloric acid, this liquor eventually going to tank $T^2$.

When the acid treatment is complete the charge is washed acid free. This can be done with small quantities of water so that the first wash is strong enough to go to tank $T^2$ and the second to tank $T^1$. The other washes can either go to waste or be treated with the other liquors for the recovery of constituents of value.

The acid treated ore is then discharged as above from the filter into the slurry mixer $M^2$, made into a slurry with brine, and then pumped by the slurry pump $P^6$ into the rotary filter $F^2$. The cold brine can then be blown out and returned to the tank via pump $P^7$ and pipe line to tank $T^4$.

Brine is then pumped from tank $T^4$ by pump $P^4$ through the tubular heater $H$ into the second filter $F^2$.

The filter is then rotated till the hot brine is saturated with lead chloride, the hot saturated solution being then blown out and pumped by pump $P^7$ through the cooler C into the classifier D where the lead chloride crystals are recovered while the cold brine returns to tank $T^4$ by pump $P^8$.

This treatment with hot brine is repeated till all the lead chloride has been dissolved out of the treated ore. The lead free ore is then washed with water, and the residue discharged from the filter. By having two filters in the brine leaching circuit the process can be made continuous as one filter can be rotated to dissolve the lead chloride while the other is being emptied through the coolers.

In a modification as where weak acid or neutral liquors or slightly alkaline liquors are being used the construction of filter and arrangement thereof in the drum and the construction of the latter may be such as is shown in Figures 8 to 12.

The drum shown in section in Figure 8 may be rotatably driven and supported in any manner and may have a shell $d$ of copper provided internally, as by riveting, with a number of longitudinally disposed and equally pitched cleat bars $u$ as shown in Figures $8^a$, 9 and 10 extending from the remote ends of the drum to the central region thereof where they butt against the sides of a bridge piece $v$ (see Figures 11 and 12) providing in its interior an annular passage corresponding to that $o$ referred to in the preceding paragraphs. At each of the remote ends of the drum the cleat bars meet with the inside face of an annular end piece $v'$ provided for the purpose hereinafter indicated.

The grooved backing $g$ for the filter cloth (and layer or layers of rubber mesh fabric not shown) is provided in dove-tailed spaces between the adjacent pairs of the cleat bars $u$ being conveniently held in position as by wedging or being made a driving fit between the cleat bars and driven from the cylinder ends into said spaces.

Figure 11:
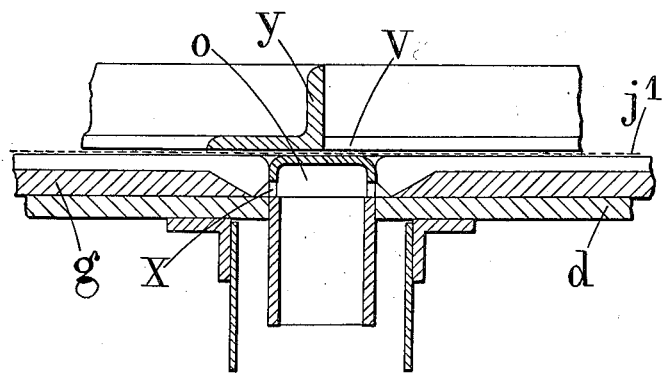
Figures 11 and 12 are cross-sectional views corresponding approximately to Figures 5 and 6.

The grooved staves $g$ which may be of any suitable material which will stand up to the liquors present are shaped as shown in Figure 11 where they butt against the bridge piece $v$ at the centre of the drum. The grooves are here cut down through the full depth or thickness of the stave $g$ and the end thereof is chamfered or undercut so as to connect the grooves in the staves with the interior of the bridge piece through cut-away portions or ports $x$ in the sides of the latter.

Figure 12:
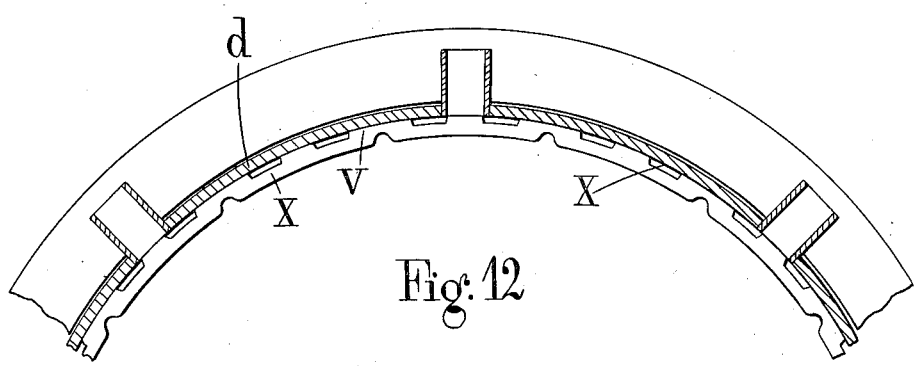

The filter cloth $j'$, which may for instance be a fine metal gauze, say Monel metal of 400 mesh, and the rubber cord fabric is spread over the grooved wood and the cleat bars and central bridge piece and is held in place by means of rods $w$, $w$ each passing through one of a corresponding number of holes in the annular end pieces $v'$ above referred to (and shown in Figure $8^a$) and drawing the cloth into the grooves into the cleat bars as shown also in Figure 10 and into corresponding recesses formed in the central bridge piece shown in Figure 12.

Liquors and ore or other solid material may be introduced through the end cover $r^3$ if desired by similar means to those previously described with reference to another construction of drum.

To provide automatic moving of the treated ore or the like or the residues across the filter under rotation of the drum, as when it is desired to remove material in a dry state from the drum, a series of helically arranged guiding members, for instance angle irons $y$, are provided, these being secured on the inside of the protected filter as by bolting through the cloth retaining rods $w$, the cleat bars $u$ and the shell $d$ of the drum. The solids are thus moved towards the cover $r^4$ which is removable axially from the drum end when desired. It is preferable to employ a toggle gear such as is shown for moving the cover from the opened to closed position. This gear which rotates with the drum can be speedily manipulated as is desirable and can hold the cover in position with the necessary thrust to prevent leakage during the liquor treatments.

Modifications it is to be understood may be made to the foregoing method and constructions of apparatus or fabrics without departing from the spirit of the invention.

Having now described my invention, what I claim as new and desire to secure by Letters Patent is:—

1. In a filter, at least one liquid venting layer of perforate rubber material.

2. In a filter, at least one liquid venting layer of woven rubber cord fabric.

3. In a filter, at least one liquid venting layer of perforate rubber material of a resistant character.

4. In a filter, at least one liquid venting layer of perforate rubber material of a resistant and substantially inextensible character.

5. In a filter, at least one liquid venting layer of perforate rubber material reinforced by tensile material.

6. In a filter, at least one liquid venting layer of fabric woven from cords of rubber resistant to chemical attack and erosion.

7. In a filter, at least one layer of resistant liquid-pervious rubber material laid over to protect another liquid venting layer.

8. In a filter, at least one liquid venting layer of perforate rubber material and at least one liquid venting layer of other material.

9. In a filter, at least one liquid venting layer of perforate rubber material and at least one liquid venting layer of other material having finer interstices.

10. In a filter, at least one liquid venting layer of perforate rubber material and a liquid venting backing of relatively hard material forming a base for said rubber material.

11. In a filter, at least one liquid venting layer of perforate rubber material, at least one liquid venting layer of other material having finer interstices, and a liquid venting backing of relatively hard material forming a base for said rubber materials.

12. In a filter according to claim 10, said base-forming hard material constituting a lining for a wall in a filter vessel.

13. In a filter, at least one liquid venting layer of perforate rubber material of a resistant character, a liquid venting backing of relatively hard material serving as a backing for said rubber material and constituting an internal lining in a rotary reaction filter.

14. In a filter, a plurality of superposed layers of liquid venting material including at least one layer of perforate rubber material adapted to provide for keying of solids thereupon while said solids are subjected to liquid treatment.

15. In a filter, a plurality of superposed layers of liquid venting material including a plurality of adjacent layers of perforate woven rubber cord fabric co-operating to provide for keying of solids thereupon while said solids are subjected to liquid treatment.

16. In filtering apparatus, at least one vessel having a lining therein comprising a liquid venting layer of hard material serving as a base for at least one overlying liquid venting flexible layer including at least one layer of perforate rubber material of a resistant character serving as a protector, means for admitting liquors and solids into said vessel onto said protector layer, and means for removing filtrate liquors from said vessel.

17. In reaction filter apparatus, at least one rotatable drum vessel, a lining on an inner peripheral wall thereof comprising a liquid venting layer of hard material serving as a base for at least one overlying liquid venting flexible layer including at least one layer of perforate rubber material of a resistant character serving as a protector, means situated coaxially of said drum adjacent an end region thereof for permitting admission of liquors and solids onto said protector layer while the drum is rotated, annular passage means in said drum in communication with said liquid venting layers and means in connection with said drum and providing for escape of filtrate liquors from said annular passage means.

18. In filter apparatus according to claim 17, means for effecting removal of solids from said drum, including scoop means adapted to lead said solids to an outlet disposed in an end of said drum remote from said admission means.

19. In filter apparatus according to claim 16, means for retaining said overlying layer means against said harder material base, said retaining means comprising clamping elements.

20. In filter apparatus according to claim 16, said base for said overlying layer means comprising stave elements in edgewise juxtaposition having grooved surfaces of cambered configuration and clamping means adapted for retaining said overlying layer means against said cambered surfaces.

21. In filter apparatus according to claim 17, said base for said overlying layer means comprising stave elements retained in longitudinal juxtaposition on said inner peripheral wall of the drum by longitudinally disposed channel elements, said stave elements having longitudinally grooved surfaces of cambered section, and means for retaining said overlying layer means against said grooved surfaces, said retaining means comprising rod elements co-operating with said channel elements to clamp said overlying layer means between them.

In testimony whereof I have signed my name to this specification.

STANLEY COCHRAN SMITH.